USO09902235B2

United States Patent
Tanda et al.

(10) Patent No.: US 9,902,235 B2
(45) Date of Patent: Feb. 27, 2018

(54) VEHICLE AIR-CONDITIONING APPARATUS

(75) Inventors: Kiyoshi Tanda, Kumagaya (JP); Hiroyuki Ida, Kumagaya (JP)

(73) Assignee: VALEO JAPAN CO., LTD., Kumagaya-Shi (JP)

( * ) Notice: Subject to any disclaimer, the term of this patent is extended or adjusted under 35 U.S.C. 154(b) by 939 days.

(21) Appl. No.: 14/342,547

(22) PCT Filed: Sep. 6, 2011

(86) PCT No.: PCT/JP2011/004981
§ 371 (c)(1),
(2), (4) Date: May 1, 2014

(87) PCT Pub. No.: WO2013/035130
PCT Pub. Date: Mar. 14, 2013

(65) Prior Publication Data
US 2014/0298837 A1 Oct. 9, 2014

(51) Int. Cl.
*B60H 1/00* (2006.01)
*F25B 41/04* (2006.01)

(52) U.S. Cl.
CPC ..... *B60H 1/00785* (2013.01); *B60H 1/00921* (2013.01); *F25B 41/04* (2013.01); *F25B 2600/2501* (2013.01)

(58) Field of Classification Search
CPC ............ F25B 41/04; B60H 2600/2501; B60H 1/00921; B60H 1/00785; B60H 1/00914
(Continued)

(56) References Cited

U.S. PATENT DOCUMENTS 5,473,906 A * 12/1995 Hara .................. B60H 1/00007
62/160
5,477,700 A * 12/1995 Iio ...................... B60H 1/00392
62/196.4
(Continued)

FOREIGN PATENT DOCUMENTS

JP  H 06-183247 A   7/1994
JP  H 06-341732 A  12/1994
(Continued)

OTHER PUBLICATIONS

International Search Report for Application No. PCT/JP2011/004981 dated Dec. 6, 2011, 5 pages.
(Continued)

*Primary Examiner* — Kun Kai Ma
(74) *Attorney, Agent, or Firm* — Howard & Howard Attorneys PLLC

(57) ABSTRACT

To provide a vehicle air-conditioning apparatus which can ensure a dehumidifying ability even during an intermediate thermal load time where an outside air temperature becomes high during a dehumidifying heating operation time. In a vehicle air-conditioning apparatus, at least a compressor 6, a first heat exchanger 2, a first refrigerant control part 9 which is formed by connecting a first expansion device 7 and a first open/close valve 8 in parallel to each other, a vehicle exterior heat exchanger 4, a second refrigerant control part 13 which is formed by connecting a second expansion device 12 and a second open/close valve 11 in series, and a second heat exchanger 3 are connected in the preceding order in a loop.

6 Claims, 7 Drawing Sheets

| mode | V-1 (8) | V-2 (11) | V-3 (14) | V-4 (17) | damper (5) |
|---|---|---|---|---|---|
| cooling | opened | opened | closed | closed | Full Cool |
| heating | closed | closed | closed | opened | Full Hot |
| dehumidifying heating (low load : 5~15°C) | closed | closed | opened | opened | Full Hot or intermediate position |
| dehumidifying heating (intermediate load : 15~25°C) | closed | opened | opened | closed | Full Hot or intermediate position |

(58) Field of Classification Search
USPC .......................................... 62/196.4, 196.1
See application file for complete search history.

(56) References Cited

U.S. PATENT DOCUMENTS

| | | | | |
|---|---|---|---|---|
| 5,899,086 | A * | 5/1999 | Noda | B60H 1/00914 165/42 |
| 5,996,360 | A * | 12/1999 | Tanaka | B60H 1/00907 62/159 |
| 6,035,653 | A * | 3/2000 | Itoh | B60H 1/00878 62/176.5 |
| 6,105,666 | A * | 8/2000 | Tajima | B60H 1/00914 165/202 |
| 6,125,643 | A * | 10/2000 | Noda | B60H 1/00914 165/202 |
| 6,237,351 | B1 * | 5/2001 | Itoh | B60H 1/00921 62/113 |
| 6,293,123 | B1 * | 9/2001 | Iritani | B60H 1/3205 62/197 |
| 6,314,750 | B1 * | 11/2001 | Ishikawa | B60H 1/00921 62/129 |
| 6,422,308 | B1 * | 7/2002 | Okawara | B60H 1/00921 165/202 |
| 2004/0079096 | A1 * | 4/2004 | Itoh | B60H 1/00735 62/223 |
| 2005/0132731 | A1 * | 6/2005 | Nakamura | B60H 1/3205 62/160 |
| 2005/0178523 | A1 * | 8/2005 | Itoh | B60H 1/00385 165/42 |
| 2009/0277193 | A1 * | 11/2009 | Springer | F24F 3/153 62/93 |
| 2011/0167849 | A1 * | 7/2011 | Kobayashi | B60H 1/00914 62/159 |
| 2011/0167850 | A1 * | 7/2011 | Itoh | F25B 5/04 62/160 |
| 2011/0174000 | A1 * | 7/2011 | Richter | B60H 1/00064 62/93 |
| 2012/0011869 | A1 * | 1/2012 | Kondo | B60H 1/2225 62/176.5 |
| 2012/0227431 | A1 * | 9/2012 | Wang | B60H 1/00921 62/238.7 |
| 2012/0255319 | A1 * | 10/2012 | Itoh | F24F 3/1405 62/160 |
| 2013/0025312 | A1 * | 1/2013 | Hayashi | B60H 1/3213 62/238.7 |
| 2013/0055743 | A1 * | 3/2013 | Ogasawara | B60H 1/00914 62/156 |
| 2014/0069123 | A1 * | 3/2014 | Kim | F25B 5/04 62/61 |
| 2014/0360215 | A1 * | 12/2014 | Inaba | B60H 1/3207 62/216 |
| 2015/0253045 | A1 * | 9/2015 | Yamada | F25B 5/04 62/324.1 |

FOREIGN PATENT DOCUMENTS

| | | |
|---|---|---|
| JP | 2000-052757 A | 2/2000 |
| JP | 2004-085176 A | 3/2004 |
| JP | 2006-044607 A | 2/2006 |
| JP | 2011-143796 A | 7/2011 |
| WO | WO 2011/016264 A1 | 2/2011 |

OTHER PUBLICATIONS

English language abstract and machine-assisted English translation for JPH 06-183247 extracted from the PAJ database on Jun. 19, 2014, 30 pages.
English language abstract and machine-assisted English translation for JPH 06-341732 extracted from the PAJ database on Jun. 19, 2014, 43 pages.
English language abstract and machine-assisted English translation for JP 2000-052757 extracted from the PAJ database on Jun. 19, 2014, 26 pages.
English language abstract and machine-assisted English translation for JP 2004-085176 extracted from the PAJ database on Jun. 19, 2014, 110 pages.
English language abstract and machine-assisted English translation for JP 2006-044607 extracted from the PAJ database on Jun. 19, 2014, 29 pages.
English language abstract for JP 2011-143796 extracted from espacenet.com database on Jun. 19, 2014, 17 pages.
English language abstract for WO 2011/016264 extracted from espacenet.com database on Jun. 19, 2014, 48 pages.

* cited by examiner

| mode | V-1 (8) | V-2 (11) | V-3 (14) | V-4 (17) | damper (5) |
|---|---|---|---|---|---|
| cooling | opened | opened | closed | closed | Full Cool |
| heating | closed | closed | closed | opened | Full Hot |
| dehumidifying heating (low load : 5~15°C) | closed | closed | opened | opened | Full Hot or intermediate position |
| dehumidifying heating (intermediate load : 15~25°C) | closed | opened | opened | closed | Full Hot or intermediate position | cooling operation heating operation dehumidifying heating
(low thermal load)

dehumidifying heating
(intermediate thermal load)

| mode | V-1 (8) | three-way valve (25) | V-3 (14) | damper (5) |
|---|---|---|---|---|
| cooling | opened | second heat exchanger side | closed | Full Cool |
| heating | closed | Accum side | closed | Full Hot |
| dehumidifying heating (low load : 5~15°C) | closed | Accum side | opened | Full Hot or intermediate position |
| dehumidifying heating (intermediate load : 15~25°C) | closed | second heat exchanger side | opened | Full Hot or intermediate position |

| mode | V 1 | V 2 | V 3 | V 4 | damper |
|---|---|---|---|---|---|
| cooling operation mode | opened | opened | closed | closed | Full Cool |
| heating operation mode | closed | closed | closed | opened | Full Hot |
| dehumidifying heating operation mode | closed | closed | opened | opened | Full Hot or intermediate position | ent.

VEHICLE AIR-CONDITIONING APPARATUS

RELATED APPLICATIONS

This application is the National Stage of International Patent Application No. PCT/JP2011/004981, filed on Sep. 6, 2011, the content of which is incorporated herein by reference.

TECHNICAL FIELD

The present invention relates to a vehicle air-conditioning apparatus having a dehumidifying heating function, and more particularly to a vehicle air-conditioning apparatus which can ensure a dehumidifying ability during a dehumidifying heating operation regardless of a change in thermal load.

BACKGROUND ART

Conventionally, as a vehicle air-conditioning apparatus having a dehumidifying heating function, there has been known a vehicle air-conditioning apparatus having the constitution disclosed in the following patent literature 1 (JP-A-6-341732).

As shown in FIG. 8, this vehicle air-conditioning apparatus includes a first heat exchanger 2 where a supply amount of air to the first heat exchanger is adjusted by a damper 5 and a second heat exchanger 3 which is arranged upstream of the first heat exchanger 2 in the inside of an air conditioning unit 1. A closed loop is formed by connecting a compressor 6, the first heat exchanger 2, a first expansion device 7, a vehicle exterior heat exchanger 4 arranged outside the air conditioning unit, an open/close valve V2, a second expansion device 41, the second heat exchanger 3 and an accumulator 10 by piping in this order. A passage which is opened or closed by an open/close valve V1 is provided between an inlet side and an outlet side of the first expansion device 7, a passage which is opened or closed by an open/close valve V3 is provided between an outlet side of the first heat exchanger 2 and an inlet side of the second expansion device 41, and a passage which is opened or closed by an open/close valve V4 is provided between an outlet side of the vehicle exterior heat exchanger 4 and a suction side of the compressor 6 (an inlet side of the accumulator 10). By controlling opening/closing of the respective open/close valves V1 to V4 and the degree of opening of the damper 5, an operation mode can be changed over among a cooling operation mode, a heating operation mode and a dehumidifying heating operation mode.

To be more specific, in the cooling operation mode, the open/close valve V1 is opened, the open/close valve V2 is opened, the open/close valve V3 is closed, and the open/close valve V4 is closed. The damper 5 is set at a full-cool position such that an air supply amount to the first heat exchanger 2 is set to 0, and all air which passes through the second heat exchanger is made to bypass the first heat exchanger 2. A refrigerant compressed by the compressor 6 is made to pass through the first heat exchanger 2 and, thereafter, heat of the refrigerant is radiated by the vehicle exterior heat exchanger 4, a pressure of the refrigerant is reduced by the second expansion device 41, and some heat is absorbed by the refrigerant at the second heat exchanger 3 and, thereafter, the refrigerant is made to return to the compressor 6 through the accumulator 10.

In the heating operation mode, the open/close valve V1 is closed, the open/close valve V2 is closed, the open/close valve V3 is closed, and the open/close valve V4 is opened. The damper 5 is set at a full-hot position such that all air which passes through the second heat exchanger 3 is made to pass through the first heat exchanger 2. Heat of the refrigerant compressed by the compressor 6 is radiated by the first heat exchanger 2 and, thereafter, a pressure of the refrigerant is reduced by the first expansion device 7 and some heat is absorbed by the refrigerant at the vehicle exterior heat exchanger 4 and, thereafter, the refrigerant is made to return to the compressor 6 through the accumulator 10.

In the dehumidifying heating operation mode, the open/close valve V1 is closed, the open/close valve V2 is closed, the open/close valve V3 is opened and the open/close valve V4 is opened. The damper is set at the full-hot position or at an intermediate position. As shown in FIG. 9, heat of the refrigerant compressed by the compressor 6 is radiated by the first heat exchanger 2 and, thereafter, a pressure of a part of the refrigerant is reduced by the second expansion device 41 and some heat is absorbed by the refrigerant at the second heat exchanger 3, while a pressure of a remaining part of the refrigerant is reduced by the first expansion device 7 and some heat is absorbed by the remaining refrigerant at the vehicle exterior heat exchanger 4 and, thereafter, the refrigerant is made to return to the compressor 6 through the accumulator 10.

CITATION LIST

Patent Literature

PTL 1: JP-A-6-341732

SUMMARY OF INVENTION

Technical Problem

However, in the above-mentioned technique, a dehumidifying ability in the dehumidifying heating operation mode changes corresponding to a temperature of outside air, and during an intermediate thermal load time where the outside air temperature becomes 15 to 25° C., there exists a possibility of a drawback that a dehumidifying ability is lowered compared to a low thermal load time where outside air temperature is low (5 to 15° C.).

That is, during a low thermal load time where an outside air temperature is low, heat is radiated only by the first heat exchanger 2. Further, with respect to a refrigerant from which heat is radiated by the first heat exchanger 2, it is not the case that a pressure of the whole refrigerant is reduced by the second expansion device 41 and whole the refrigerant absorbs some heat at the second heat exchanger 3. Accordingly, the above-mentioned technique has an advantage that freezing of the second heat exchanger 3 can be prevented while ensuring an amount of heat radiated by the first heat exchanger 2 during the low thermal load time. However, during an intermediate thermal load time where an outside air temperature becomes relatively high, a heat absorption amount by the vehicle exterior heat exchanger 4 is increased and hence, a pressure of the refrigerant is elevated on a suction side of the compressor 6 (an inlet side of the accumulator 10) which is directly connected with a flowout side of the vehicle exterior heat exchanger. As a result, an evaporation pressure in the second heat exchanger 3 is elevated so that a heat absorption amount in the second heat exchanger 3 is reduced thus giving rise to a possible drawback where a sufficient dehumidifying ability cannot be ensured in the second heat exchanger 3.

The present invention has been made in view of the above-mentioned circumstances, and it is a main object of the present invention to provide a vehicle air-conditioning apparatus which can ensure a dehumidifying ability even during an intermediate thermal load time where an outside air temperature becomes high during a dehumidifying heating operation time.

Solution to Problem

To overcome the above-mentioned drawbacks, a vehicle air-conditioning apparatus according to the present invention includes: a compressor; a first heat exchanger which is arranged in the inside of an air conditioning unit and where an amount of air supplied to the first heat exchanger is adjusted by a damper; a second heat exchanger which is arranged in the inside of the air conditioning unit, the second heat exchanger being arranged upstream of the first heat exchanger in the direction of air flow in the air conditioning unit; a vehicle exterior heat exchanger which is capable of performing a heat exchange with outside air; a first refrigerant control part which is capable of throttling a refrigerant flow path; a second refrigerant control part which is capable of throttling and closing a refrigerant flow path; a third refrigerant control part which is capable of throttling and closing a refrigerant flow path; and a fourth refrigerant control part which is capable of closing a refrigerant flow path, wherein at least the compressor, the first heat exchanger, the first refrigerant control part, the vehicle exterior heat exchanger, the second refrigerant control part and the second heat exchanger are connected in the preceding order in a loop, a refrigerant flow path between the first heat exchanger and the first refrigerant control part and a refrigerant flow path between the second refrigerant control part and the second heat exchanger are connected with each other by a first bypass flow path provided with the third refrigerant control part, and a refrigerant flow path between the vehicle exterior heat exchanger and the second refrigerant control part and a refrigerant flow path between the second heat exchanger and the compressor are connected with each other by a second bypass flow path provided with the fourth refrigerant control part (claim 1).

Due to such a constitution, the first refrigerant control part which is capable of throttling the refrigerant flow path where the vehicle exterior heat exchanger is used as a heat absorber, the second refrigerant control part which is capable of throttling the refrigerant flow path where the second heat exchanger is used as a heat absorber while using the vehicle exterior heat exchanger as a radiator, and the third refrigerant control part which is capable of throttling the refrigerant flow path which is used during a dehumidifying heating operation time are provided, and the refrigerant flow path can be closed by the second and fourth refrigerant control parts respectively. Accordingly, by changing over the flow of a refrigerant which passes through the vehicle exterior heat exchanger, the vehicle air-conditioning apparatus can ensure a dehumidifying ability even during an intermediate thermal load time where an outside air temperature becomes relatively high by properly suppressing the rise of an evaporation pressure in the second heat exchanger.

That is, when it is determined that a thermal load does not exceed a predetermined value during a dehumidifying heating operation mode, the refrigerant flow path is throttled by the first control part, the refrigerant flow path is closed by the second refrigerant control part, the refrigerant flow path is throttled by the third refrigerant control part, and the refrigerant flow path is not closed by the fourth refrigerant control part so that a refrigerant discharged from the compressor is circulated in order of the first heat exchanger, the first refrigerant control part, the vehicle exterior heat exchanger, the fourth refrigerant control part, and the compressor, and the refrigerant is also circulated in order of the first heat exchanger, the third refrigerant control part, the second heat exchanger, and the compressor, and when it is determined that a thermal load exceeds a predetermined value during the dehumidifying heating operation mode, the refrigerant flow path is throttled by the first refrigerant control part, the refrigerant flow path is throttled by the second refrigerant control part, the refrigerant flow path is throttled by the third refrigerant control part, and the refrigerant flow path is closed by the fourth refrigerant control part so that a refrigerant discharged from the compressor is circulated in order of the first heat exchanger, the first refrigerant control part, the vehicle exterior heat exchanger, the second refrigerant control part, the second heat exchanger, and the compressor, and the refrigerant is also circulated in order of the first heat exchanger, the third refrigerant control part, the second heat exchanger, and the compressor (claim 2).

Due to such a constitution, during the low thermal load time where an outside air temperature is relatively low, a heat absorption path which passes through the vehicle exterior heat exchanger and a heat absorption path which passes through the second heat exchanger are formed in parallel to the compressor and the first heat exchanger and hence, air is dehumidified by the second heat exchanger whereby it is possible to impart a function substantially equal to a conventional function of heating air by the first heat exchanger. Further, during an intermediate thermal load time where an outside air temperature is relatively high, when a refrigerant which flows out from the vehicle exterior heat exchanger is directly returned to a suction side of the compressor, a pressure on the suction side of the compressor is elevated and, eventually, an evaporation pressure in the second heat exchanger is elevated. In view of the above, a refrigerant which passes through the vehicle exterior heat exchanger is subjected to the adiabatic expansion again by the second refrigerant control part, and the refrigerant which is subjected to the adiabatic expansion absorbs some heat at the second heat exchanger together with the refrigerant which is subjected to adiabatic expansion by the third refrigerant control part. Accordingly, there is no possibility that an evaporation pressure in the second heat exchanger will be influenced by a pressure on an outlet side of the vehicle exterior heat exchanger and hence, a dehumidifying ability can be ensured even during an intermediate thermal load time where an outside air temperature is relatively high.

Further, due to such a constitution, when a thermal load state changes from an intermediate thermal load state where an outside air temperature is relatively high to a low thermal load state where the outside air temperature is relatively low so that a thermal load condition changes from a condition where a thermal load exceeds a predetermined value to a condition where the thermal load does not exceed the predetermined value, it is determined that the thermal load does not exceed the predetermined value. Accordingly, it is possible to change a circulation state of a refrigerant from the above-mentioned circulation state of the refrigerant where it is determined that the thermal load exceeds the predetermined value to the circulation state of the refrigerant where it is determined that the thermal load does not exceed the predetermined value.

That is, when the circulation state of a refrigerant where it is determined that a thermal load exceeds a predetermined value is continued even when a thermal load of the outside air becomes low, in spite of an environment where the use of the heating ability is more requested, a refrigerant which absorbed some heat once at the vehicle exterior heat exchanger 4 is subjected to adiabatic expansion by the second refrigerant control part so that a thermal load of supplied air is low irrespective of the absorption of heat again by the second heat exchanger whereby a large heat absorption amount cannot be obtained. Accordingly, the refrigerant is made to return to the compressor 6 in a state where the temperature and the pressure are relatively low and hence, a temperature of the refrigerant discharged from the compressor 6 is not elevated whereby there exists a possibility that the sufficient heating ability cannot be ensured. However, due to such a constitution, during a low load time where an outside air temperature is low, a refrigerant which absorbed some heat at the vehicle exterior heat exchanger can be made to return to the compressor 6 without being subjected to the adiabatic expansion and hence, even when a thermal load state changes from an intermediate thermal load state where an outside air temperature is relatively high to a low thermal load state where the outside air temperature is relatively low, the vehicle air-conditioning apparatus can ensure a heating ability.

Here, assuming a cross-sectional area of a throttle portion of the first refrigerant control part, a cross-sectional area of a throttle portion of the second refrigerant control part, and a cross-sectional area of a throttle portion of the third refrigerant control part as A, B and C respectively, the respective cross-sectional areas are controlled or set such that the relationship of A≤C is established when it is determined that the thermal load does not exceed a predetermined value in a dehumidifying heating operation mode, and the respective cross-sectional areas are controlled or set such that the relationship of A≤C<B is established when it is determined that the thermal load exceeds the predetermined value in a dehumidifying heating operation mode (claim 3).

The reason that the above-mentioned relationship is established in controlling the respective cross-sectional areas is as follows. In throttling the refrigerant flow path in the first refrigerant control part, the degree of throttling is decided from a viewpoint of ensuring a heating ability, that is, the throttling of the refrigerant flow path is performed for elevating a temperature of a refrigerant at the first heat exchanger. Accordingly, it is preferable to maintain a pressure of a refrigerant in the first heat exchanger at a high level by throttling a cross-sectional area of the refrigerant flow path in the first refrigerant control part to a relatively small area.

In throttling the refrigerant flow path in the second refrigerant control part, the degree of throttling is decided from a viewpoint of ensuring a cooling ability, that is, the throttling of the refrigerant flow path is performed for obtaining a heat absorption amount at the second heat exchanger. Accordingly, it is preferable to ensure a proper refrigerant circulation amount by throttling a cross-sectional area of the refrigerant flow path in the second refrigerant control part to a relatively large area.

In the third refrigerant control part, the degree of throttling is decided from a viewpoint of ensuring a dehumidifying heating ability, that is, there exists a demand for ensuring a heating ability of the first heat exchanger. On the other hand, there also exists a demand for ensuring a certain amount of refrigerant for also acquiring a cooling ability of the second heat exchanger. Accordingly, it is desirable to set the cross-sectional area of the refrigerant flow path in the third refrigerant control part equal to or more than the cross-sectional area of the refrigerant flow path in the first refrigerant control part and smaller than the cross-sectional area of the refrigerant flow path in the second refrigerant control part.

When it is determined that a thermal load does not exceed a predetermined value, a refrigerant does not flow into the second refrigerant control part and hence, the size relationship is defined between a cross-sectional area of the refrigerant flow path controlled or set by the first refrigerant control part and a cross-sectional area of the refrigerant flow path controlled or set by the third refrigerant control part, and when it is determined that the thermal load exceeds the predetermined value, the refrigerant flows also into the second refrigerant control part and hence, it is desirable to define the size relationship also with respect to the cross-sectional area of the refrigerant flow path controlled or set by the second refrigerant control part.

Here, the first refrigerant control part is formed by connecting a first expansion device and a first open/close valve in parallel to each other, the second refrigerant control part is formed by connecting a second expansion device and a second open/close valve in series, the third refrigerant control part is formed by connecting a third expansion device and a third open/close valve in series, and the fourth refrigerant control part is formed of a fourth open/close valve (claim 4). By dividing the constitution of the refrigerant control part into the expansion device having an expansion function and the open/close valve having an open/close function, the vehicle air-conditioning apparatus can be constituted by using inexpensive parts.

Although the above-mentioned first expansion device, second expansion device and third expansion device may be formed of a fixed orifice (claim 5), the third expansion device may be formed of a variable expansion valve where a setting condition can be changed corresponding to an outside air condition (claim 6). When all of first, second and third expansion devices are formed of a fixed orifice, the expansion devices have the simple constitution compared to an expansion valve which controls the degree of opening of the expansion valve and hence, a manufacturing cost of the expansion devices can be further lowered. Further, when the third expansion device is formed of a variable expansion valve, a flow rate of a refrigerant in the first bypass flow path can be changed corresponding to a thermal load condition of outside air and hence, a controllability of dehumidifying a heating ability can be enhanced.

In the above-mentioned constitution, the second open/close valve and the fourth open/close valve are set such that when either one of these open/close valves is closed, the other is opened and hence, the second open/close valve and the fourth open/close valve may be replaced with one three-way valve (claim 7). In this case, the number of parts can be reduced.

The first refrigerant control part may be formed of a variable expansion valve which is capable of throttling and not throttling a refrigerant flow path (claim 8). The second refrigerant control part and/or the third refrigerant control part may be formed of a variable expansion valve which is capable of throttling and not throttling a refrigerant flow path (claim 9). In this case, the number of parts of the refrigerant control parts can be reduced and, at the same time, a finer air-conditioning control can be performed by controlling throttling of the refrigerant flow path.

In the above-mentioned constitution, the vehicle air-conditioning apparatus is configured such that a refrigerant is circulated in the first heat exchanger arranged in the inside of the air conditioning unit. However, the vehicle air-conditioning apparatus may be configured such that the vehicle air-conditioning apparatus includes a warm water cycle which is constituted by connecting a third heat exchanger which is arranged in the inside of the air conditioning unit and where a supply amount of air to the third heat exchanger is adjusted by a damper and a heat medium in a liquid form is circulated in the third heat exchanger; a pump which feeds the heat medium in a liquid form under pressure; and a fourth heat exchanger where heat exchange is performed between the heat medium in a liquid form and a refrigerant discharged from the compressor by piping, and the first heat exchanger may be replaced with the warm water cycle (claim 10). Due to such a constitution, the above-mentioned constitution can be realized by making use of an existing warm water heater unit. That is, it is possible to make use of a conventional air conditioning unit which is mounted on a vehicle provided with an internal combustion engine and performs heating by a warm water cycle.

In the above-mentioned constitution, the vehicle air-conditioning apparatus may further include: an internal heat exchanger where a heat exchange is performed between a refrigerant on a suction side of the compressor and the refrigerant on an outlet side of the first heat exchanger (claim 11). A heat radiation amount of the first heat exchanger can be increased.

Advantageous Effects of Invention

As has been explained heretofore, according to the present invention, the first refrigerant control part which is capable of throttling the refrigerant flow path where a heating operation is performed by using the vehicle exterior heat exchanger as a heat absorber, the second refrigerant control part which is capable of throttling the refrigerant flow path when a cooling operation is performed by using the vehicle exterior heat exchanger as a radiator and also by using the second heat exchanger as a heat absorber, and the third refrigerant control part which is capable of throttling the refrigerant flow path where a dehumidifying heating operation is performed are provided, and a dehumidifying ability of the second heat exchanger is adjustable by changing over the flow of a refrigerant which passes through the vehicle exterior heat exchanger. Accordingly, it is possible to provide a vehicle air-conditioning apparatus which can ensure a dehumidifying ability even when an outside air temperature changes from a low thermal load time to an intermediate thermal load time during the dehumidifying heating operation time.

That is, when an outside air load is increased, after the refrigerant absorbed some heat at the vehicle exterior heat exchanger, a pressure of the refrigerant is further reduced by the second refrigerant control part, and the refrigerant is made to flow into the second heat exchanger. Accordingly, it is possible to prevent an evaporation pressure in the vehicle exterior heat exchanger from being transferred to the second heat exchanger and hence, the rise of the evaporation pressure in the second heat exchanger can be suppressed whereby the vehicle air-conditioning apparatus can ensure a dehumidifying ability.

Further, by changing over the flow of a refrigerant which passes through the vehicle exterior heat exchanger, it is possible to provide the vehicle air-conditioning apparatus which can ensure a heating ability even when an outside air temperature changes from an intermediate thermal load time to a low thermal load time during the dehumidifying heating operation time.

That is, when an outside air load becomes low, a refrigerant whose heat is absorbed by the vehicle exterior heat exchanger is made to return to the compressor without being subjected to adiabatic expansion by the second refrigerant control part and hence, energy whose heat is absorbed at the vehicle exterior heat exchanger can be supplied to the first heat exchanger through the compressor whereby the vehicle air-conditioning apparatus can ensure a heating ability.

BRIEF DESCRIPTION OF DRAWINGS

[FIG. 1]

FIGS. 1A and 1B are views showing a vehicle air-conditioning apparatus according to the present invention, wherein FIG. 1A is a view showing the overall constitution of the vehicle air-conditioning apparatus, and FIG. 1B is a table showing operation modes and a state of open/close valves and a damper.

[FIG. 4]

FIGS. 4A and 4B are views for explaining the flow of a refrigerant in a dehumidifying heating operation mode time of the vehicle air-conditioning apparatus according to the present invention, wherein FIG. 4A shows a dehumidifying heating operation mode in a low thermal load time where an outside air load is low (outside air temperature: 5 to 15° C.), and FIG. 4B shows a dehumidifying heating operation mode in an intermediate thermal load time where an outside air load is relatively high (outside air temperature: 15 to 25° C.).

[FIG. 5]

FIGS. 5A and 5B are views showing a modification of the vehicle air-conditioning apparatus according to the present invention (an embodiment where a second open/close valve and a fourth open/close valve are replaced with one three-way valve), wherein FIG. 5A is a view showing the overall constitution of the vehicle air-conditioning apparatus, and FIG. 5B is a table showing operation modes and a state of respective open/close valves and a damper.

[FIG. 8]

FIGS. 8A and 8B show a conventional vehicle air-conditioning apparatus, wherein FIG. 8A is a view showing the overall constitution of the vehicle air-conditioning apparatus, and FIG. 8B is a table showing operation modes and a state of open/close valves and a damper.

DESCRIPTION OF EMBODIMENTS

Hereinafter, an embodiment of a vehicle air-conditioning apparatus according to the present invention is explained in conjunction with drawings.

Figures 1A, 1B:
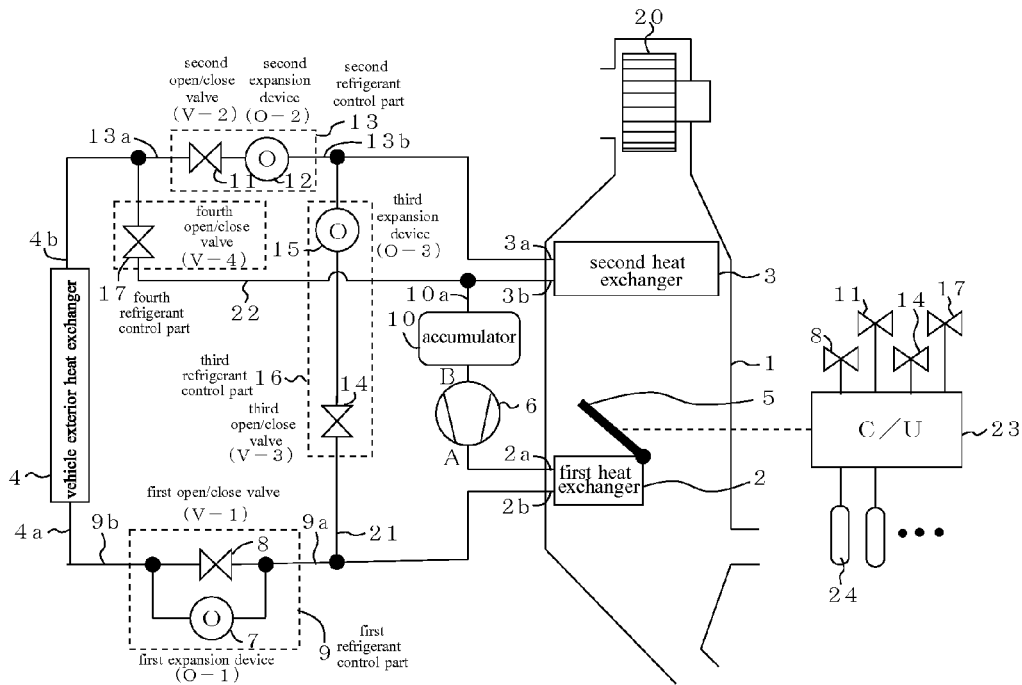

FIG. 1 shows the vehicle air-conditioning apparatus according to the present invention. The vehicle air-conditioning apparatus is mounted on an automobile, for example. The vehicle air-conditioning apparatus includes: first and second heat exchangers 2, 3 arranged in an air conditioning unit 1; and a vehicle exterior heat exchanger 4 which is arranged outside the air conditioning unit 1 and is capable of performing heat exchange with outside air.

An inside/outside air switching device not shown in the drawing is provided on a most upstream side of the air conditioning unit 1, and an inside air inlet or an outside air inlet is selectively opened by an intake door. Inside air or outside air which is selectively introduced into the air conditioning unit 1 is sucked by the rotation of a blower 20 and is supplied to the first and second heat exchangers 2, 3 where the supplied air is subjected to heat exchange, and heat-exchanged air is supplied to a cabin through a desired blow-off port.

The first heat exchanger 2 is arranged downstream of the second heat exchanger 3 in the direction of air flow in the air conditioning unit, and a damper 5 is arranged upstream of the first heat exchanger 2 in the direction of air flow. The damper 5 can change the position thereof from a position at which an amount of air which passes through the first heat exchanger 2 becomes the maximum (full hot position: the degree of opening being 100%) to a position at which an amount of air which passes through the first heat exchanger 2 becomes the minimum (full cool position: the degree of opening being 0%). By adjusting the degree of opening of the damper 5, a ratio between air which passes through the first heat exchanger 2 and air which bypasses the first heat exchanger 2 can be adjusted.

An inlet side 2a of the first heat exchanger 2 is connected to a discharge side A of a compressor 6, and an outlet side 2b of the first heat exchanger 2 is connected to an inlet side 9a of a first refrigerant control part 9 which is formed by connecting a first expansion device (O-1) 7 and a first open/close valve (V-1) 8 in parallel to each other. An outlet side 3b of the second heat exchanger 3 is connected to a suction side B of the compressor 6 through an accumulator 10.

An outlet side 9b of the first refrigerant control part 9 is connected to an inlet side 4a of the vehicle exterior heat exchanger 4, and an outlet side 4b of the vehicle exterior heat exchanger 4 is connected to an inlet side 3a of the second heat exchanger 3 through a second refrigerant control part 13 which is formed by connecting a second open/close valve (V-2) 11 and a second expansion device (O-2) 12 in series. Due to such a constitution, a refrigerant circulating cycle is formed where the compressor 6, the first heat exchanger 2, the first refrigerant control part 9, the vehicle exterior heat exchanger 4, the second refrigerant control part 13, the second heat exchanger 3, the accumulator 10, and the compressor 6 are connected in the above-mentioned order in a loop. It is sufficient that the second open/close valve (V-2) 11 and the expansion device (O-2) 12 are connected in series. That is, it does not matter which one of the second open/close valve (V-2) 11 and the expansion device (O-2) 12 is arranged on an upstream of the other (or downstream of the other) in the direction along which a refrigerant flows.

A refrigerant flow path between the outlet side 2b of the first heat exchanger 2 and the inlet side 9a of the first refrigerant control part 9 and a refrigerant flow path between an outlet side 13b of the second refrigerant control part 13 and the inlet side 3a of the second heat exchanger 3 are connected to each other by a first bypass flow path 21 having a third refrigerant control part 16 which is constituted of a third open/close valve (V-3) 14 and a third expansion device (O-3) 15. A refrigerant flow path between the outlet side 4b of the vehicle exterior heat exchanger 4 and an inlet side 13a of the second refrigerant control part 13 and a refrigerant flow path between the outlet side 3b of the second heat exchanger 3 and the suction side B of the compressor 6 (an inlet side 10a of the accumulator 10) are connected to each other by a second bypass flow path 22 which is opened or closed by a fourth open/close valve (V-4) 17. It is also sufficient that the third open/close valve (V-3) 14 and the third expansion device (O-3) 15 are connected in series. That is, it does not matter which one of the third open/close valve (V-3) 14 and the third expansion device (O-3) 15 is arranged on an upstream of the other (or downstream of the other) in the direction along which a refrigerant flows. The open/close valve (V-4) 17 is arranged as a fourth refrigerant control part.

In the above-mentioned constitutional example, the first to third expansion devices 7, 12, 15 are preferably formed of a fixed orifice. From a viewpoint of enhancing a heating ability, it is preferable that a cross section of a path at a throttle portion of the first expansion device 7 be set to be decreased as much as possible. From a viewpoint of ensuring a cooling ability, that is, from a viewpoint of increasing a supply amount of a refrigerant while reducing a pressure of the refrigerant, it is preferable that a cross section of a path at a throttle portion of the second expansion device 12 be set relatively large. From a viewpoint of necessity of ensuring a dehumidifying ability and ensuring a heating ability to some extent, it is preferable that a cross section of a path at a throttle portion of the third expansion device 15 be set equal to or larger than the cross section of the path of the first expansion device 7 and smaller than the cross section of the path of the second expansion device 12. That is, assuming cross-sectional areas of the paths of the respective throttle portions of the first expansion device 7, the second expansion device 12, and the third expansion device 15 as A, B and C, the relationship $A \leq C < B$ is established among the cross-sectional areas of the paths of the respective throttle portions.

Figure 4A:
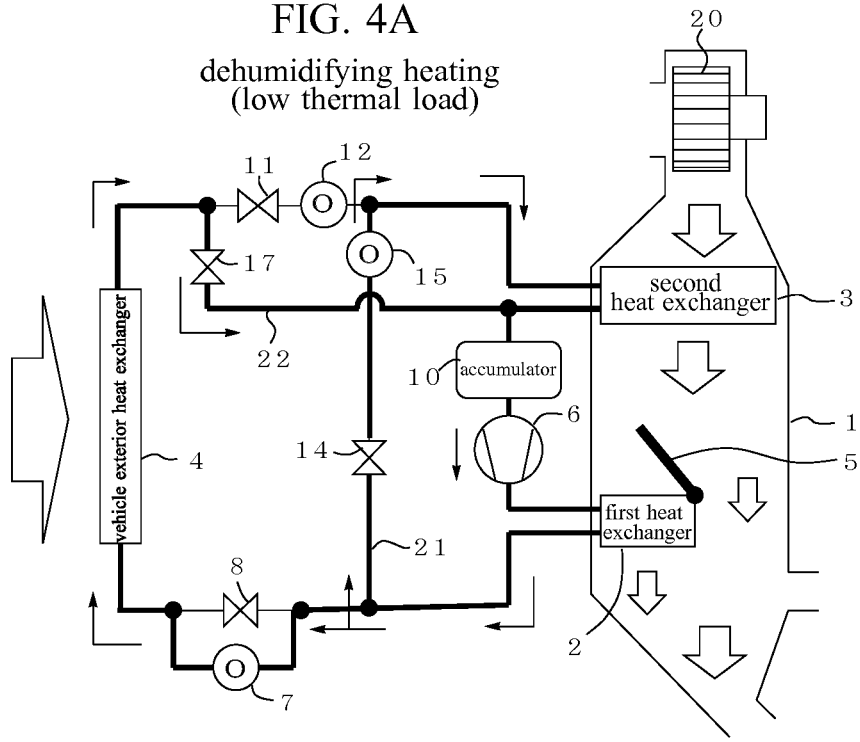
Figure 4B:
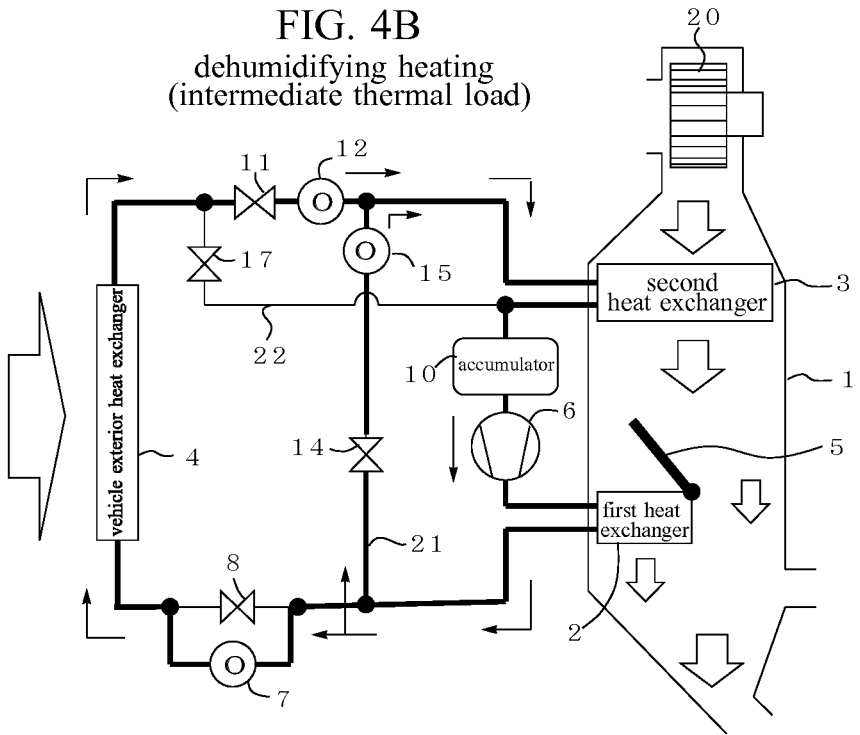

Assuming a case where the relationship $C < A$ is established, a rate of a refrigerant which passes through the first bypass flow path 21 provided with the third expansion device 15 becomes so small that the most of the circulating refrigerant passes through the vehicle exterior heat exchanger 4 and hence, even when a dehumidifying heating operation is performed during a low thermal load time as shown in FIG. 4A, an amount of refrigerant which passes through the second heat exchanger is small so that there exists a possibility that a dehumidifying ability becomes insufficient. Also assuming a case where the relationship $B < C$ is established, a rate of a refrigerant which passes through the first bypass flow path 21 provided with the third expansion device 15 becomes so large that most of the circulating refrigerant does not pass through the vehicle exterior heat exchanger 4. As a result, even when a dehumidifying heating operation is performed in a low thermal load time as shown in FIG. 4A, an amount of heat absorption at the vehicle exterior heat exchanger is small and hence, there arises a possibility that an amount of heat radiation at the first heat exchanger becomes insufficient. Further, even when either one of dehumidifying heating operations shown in FIGS. 4A, 4B is performed, an amount of refrigerant which passes through the second heat exchanger is large thus giving rise to a drawback that freezing occurs. Also assuming that the relationship B=C is established, the operation mode becomes substantially equal to the operation mode when the relationship B<C is established. That is, when the relationship B=C is established, the path resistance of the second expansion device and the path resistance of the third expansion device are substantially equal. However, to consider the case where the operation mode is a dehumidifying heating mode, as can be understood from FIG. 4A and FIG. 4B, the vehicle exterior heat exchanger and the first expansion device are arranged upstream of the second expansion device, and the vehicle exterior heat exchanger and the first expansion device generate the path resistances respectively. Accordingly, the path resistance of the first bypass flow path becomes relatively low and hence, a rate of a refrigerant which passes through the first bypass flow path is increased.

Opening/closing of the open/close valves 8, 11, 14, 17 and the degree of opening of the damper 5 are controlled in response to a control signal from a control unit 23. The control unit 23 per se is a known unit which includes: an input circuit having an A/D convertor, a multiplexer and the like; an arithmetic processing circuit having a ROM, a RAM, a CPU and the like; and an output circuit having a drive circuit and the like. Upon inputting of an outside air temperature signal from an outside air temperature sensor 24 which detects an outside air temperature and various signals for setting an operation mode into the control unit 23, the control unit 23 processes these signals in accordance with a predetermined program set in advance.

Particularly, when the dehumidifying heating operation mode is set as the operation mode, a dehumidifying heating mode can be changed over based on an outside air temperature. When an outside air temperature falls within a range from 5 to 15° C. (during a low thermal load time where an outside air load is low), the dehumidifying heating operation mode for a low thermal load described later is set as the operation mode, while when an outside air temperature falls within a range from 15 to 25° C. (during the intermediate thermal load time where an outside air load is relatively high), the dehumidifying heating operation mode for an intermediate thermal load described later is set as the operation mode.

Next, among control operations performed by the control unit 23, specific examples of control operations of the open/close valves 8, 11, 14, 17 and the damper 5 are explained with respect to the respective operation modes.

Figure 2:
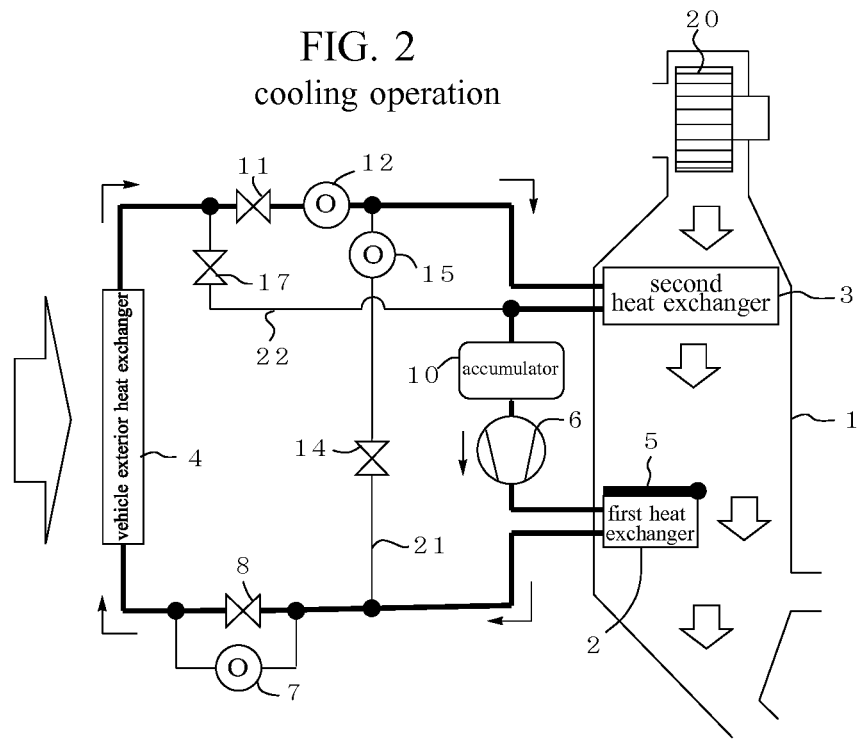
FIG. 2 is a view for explaining the flow of a refrigerant in a cooling operation mode time of the vehicle air-conditioning apparatus according to the present invention.

Firstly, when a cooling operation mode is set as the operation mode, as shown also in FIG. 2, the control unit 23 opens the first and second open/close valves 8, 11, closes the third and fourth open/close valves 14, 17, and sets the degree of opening of the damper 5 at a full cool position (a position where the degree of opening of the damper 5 is 0%). Because of this setting of positions of the valves and the damper, a compressed refrigerant discharged from the discharge side A of the compressor 6 passes through the first heat exchanger 2 without radiating heat in the first heat exchanger 2 since there is no air which passes through the first heat exchanger 2. Then, the refrigerant enters the vehicle exterior heat exchanger 4 through the first open/close valve 8, and heat of the refrigerant is radiated (the refrigerant being condensed and liquefied) in the vehicle exterior heat exchanger 4. Thereafter, the refrigerant reaches the second expansion device 12 through the second open/close valve 11 and a pressure of the refrigerant is reduced by the second expansion device 12. Then, the refrigerant enters the second heat exchanger 3 where some heat is absorbed by the refrigerant (the refrigerant being evaporated). Then, the refrigerant is returned to the compressor 6 through the accumulator 10. Accordingly, air supplied from the upstream of the air conditioning unit 1 is cooled by the second heat exchanger 3, and is directly supplied to the inside of a cabin as cold air while bypassing the first heat exchanger 2.

Figure 3:
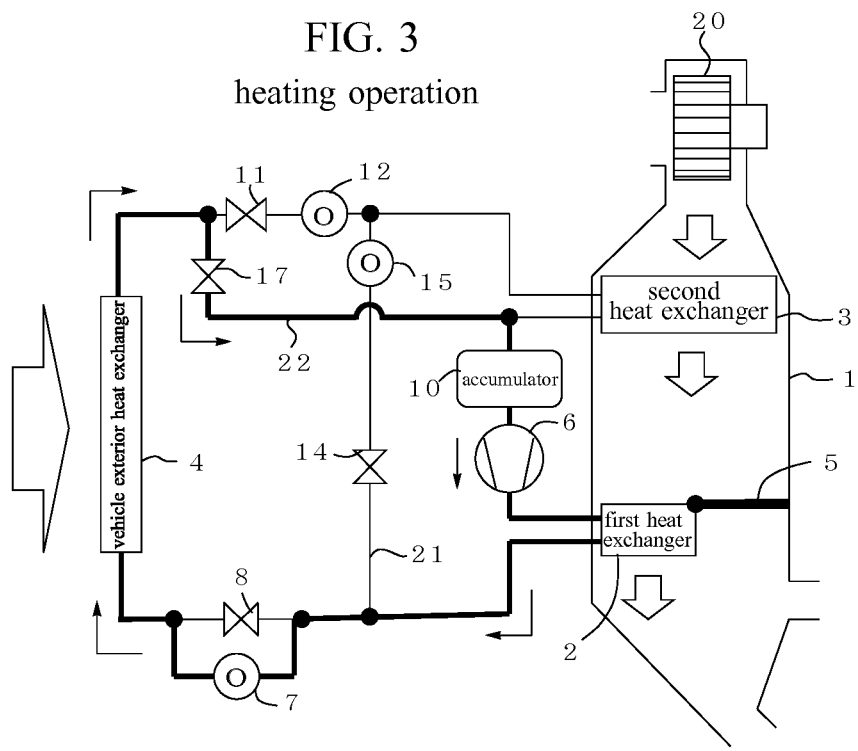
FIG. 3 is a view for explaining the flow of a refrigerant in a heating operation mode time of the vehicle air-conditioning apparatus according to the present invention.

When a heating operation mode is set as the operation mode, as shown also in FIG. 3, the control unit 23 closes the first and second open/close valves 8, 11, closes the third open/close valve 14, opens the fourth open/close valve 17, and sets the degree of opening of the damper 5 to a full hot position (a position where the degree of opening is 100%). Because of this setting of positions of the valves and the damper, heat of a compressed refrigerant discharged from the discharge side A of the compressor 6 is radiated (the refrigerant being condensed and liquefied) at the first heat exchanger 2, and a pressure of the refrigerant is reduced by the first expansion device 7. Then, the refrigerant reaches the vehicle exterior heat exchanger 4 where some heat is absorbed by the refrigerant (the refrigerant being evaporated) and, thereafter, the refrigerant passes through the fourth open/close valve 17, and is returned to the compressor 6 through the accumulator 10. Accordingly, although air supplied from the upstream of the air conditioning unit 1 passes through the second heat exchanger 3, air is not subjected to a heat exchange by the second heat exchanger 3 and all air is introduced into the first heat exchanger 2 where air is heated and, thereafter, air is supplied to the inside of the cabin as warm air.

When a dehumidifying heating operation mode is set as the operation mode and an outside air temperature falls within a range from 5 to 15° C., as shown also in FIG. 4A, a dehumidifying heating operation mode for low thermal load is set as the operation mode. The control unit 23 closes the first and second open/close valves 8, 11, opens the third and fourth open/close valves 14, 17, and sets the degree of opening of the damper 5 to the full hot position or a desired intermediate position. Because of this setting of positions of the valves and the damper, heat of a compressed refrigerant discharged from the discharge side A of the compressor 6 is radiated (the refrigerant being condensed and liquefied) at the first heat exchanger 2, and a pressure of the refrigerant is reduced by the first expansion device 7. Then, the refrigerant reaches the vehicle exterior heat exchanger 4 where some heat is absorbed by the refrigerant (the refrigerant being evaporated) and, thereafter, the refrigerant passes through the fourth open/close valve 17, and is returned to the compressor 6 through the accumulator 10. At the same time, a pressure of the refrigerant which passes through the first heat exchanger 2 is reduced by the third expansion device 15, the refrigerant reaches the second heat exchanger 3 where some heat is absorbed by the refrigerant (the refrigerant being evaporated) and, thereafter, the refrigerant is returned to the compressor 6 through the accumulator 10. Accordingly, air supplied from the upstream of the air conditioning unit 1 is dehumidified by the second heat exchanger 3, is heated when air passes through the first heat exchanger 2, and is supplied to the inside of the cabin as dried warm air.

When a dehumidifying heating operation mode is set as the operation mode and an outside air temperature falls within a range from 15 to 25° C., as shown in FIG. 4B, a dehumidifying heating operation mode for an intermediate thermal load is set as the operation mode. The control unit 23 closes the first open/close valve 8, opens the second open/close valve 11, opens the third open/close valve 14, closes the fourth open/close valve 17, and sets the degree of opening of the damper 5 to a full hot position or a desired intermediate position. Because of this setting of positions of the valves and the damper, heat of a compressed refrigerant discharged from the discharge side A of the compressor 6 is radiated (the refrigerant being condensed and liquefied) at the first heat exchanger 2, and a pressure of the refrigerant is reduced by the first expansion device 7. Then, the refrigerant reaches the vehicle exterior heat exchanger 4 where some heat is absorbed by the refrigerant (the refrigerant being evaporated) and, thereafter, the refrigerant enters second expansion device 12 after passing through the second open/close valve 11. A pressure of the refrigerant is reduced by the second expansion device 12, and the refrigerant is supplied to the second heat exchanger 3. Some heat is absorbed by the refrigerant at the second heat exchanger 3 and, thereafter, the refrigerant is returned to the compressor 6 through the accumulator 10. At the same time, a pressure of the refrigerant which passes through the first heat exchanger 2 is reduced by the third expansion device 15, the refrigerant enters the second heat exchanger 3 where some heat is absorbed by the refrigerant (the refrigerant being evaporated) and, thereafter, the refrigerant is returned to the compressor 6 through the accumulator 10. Accordingly, air supplied from the upstream of the air conditioning unit 1 is dehumidified by the second heat exchanger 3, is heated when air passes through the first heat exchanger 2, and is supplied to the inside of a cabin as dried warm air.

During the intermediate thermal load time, an evaporation pressure of the refrigerant which passes through the vehicle exterior heat exchanger 4 is high. However, the flow of the refrigerant is set such that the refrigerant which passes through the vehicle exterior heat exchanger 4 is not directly introduced into the accumulator 10 and hence, an evaporation pressure in the second heat exchanger 3 is not increased due to the propagation of the evaporation pressure in the vehicle exterior heat exchanger 4. Further, the flow of the refrigerant is set such that, after a pressure of the refrigerant which passes through the vehicle exterior heat exchanger 4 is reduced by means of the second expansion device 12, the refrigerant is introduced into the second heat exchanger 3 together with the refrigerant which is subjected to the adiabatic expansion by means of the third expansion device 15. Accordingly, a heat absorbing ability of the second heat exchanger 3 can be also enhanced so that the vehicle air-conditioning apparatus can ensure a sufficient dehumidifying ability.

Figures 5A, 5B:
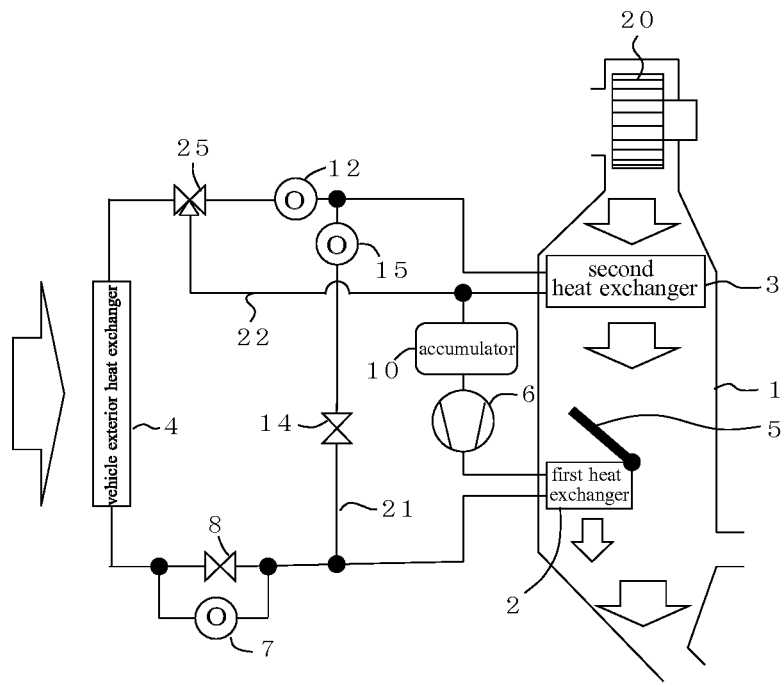

In the above-mentioned cycle configuration, the second open/close valve (V-2) 11 and the fourth open/close valve (V-4) 17 are configured to be selectively openable and hence, as shown in FIG. 5, the second open/close valve (V-2) 11 and the fourth open/close valve (V-4) 17 may be formed by one three-way valve 25 by combining these valves.

In the above-mentioned constitution, the explanation has been made with respect to the example where the first to third expansion devices 7, 12, 15 are formed of a fixed orifice. A cross section of a path of a throttle portion in the first expansion device 7 and a cross section of a path of a throttle portion in the second expansion device 12 may be almost unequivocally decided from a viewpoint of deciding a heating ability and a cooling ability. However, the third expansion device 15 may be replaced with a variable expansion valve for finely adjusting a ratio between a dehumidifying ability and a heating ability during a dehumidifying heating operation.

Due to such a constitution, by setting the degree of throttling of the variable expansion valve slightly smaller in a dehumidifying heating operation during a low thermal load time where it is desirable to ensure a heating ability, a heat radiation amount of the first heat exchanger 2 can be increased so that a heating ability can be enhanced. Further, by setting the degree of throttling of the variable expansion valve slightly larger in a dehumidifying heating operation during an intermediate thermal load time where it is desirable to ensure a dehumidifying ability, a circulation amount of a refrigerant which passes through the first bypass flow path, that is, a circulation amount of the refrigerant which does not pass through the vehicle exterior heat exchanger thus not absorbing heat from air outside the cabin is increased whereby a dehumidifying ability of the second heat exchanger 3 can be enhanced.

Due to the introduction of such a variable expansion valve, in a dehumidifying heating operation during a low thermal load time or in a dehumidifying heating operation during an intermediate thermal load time, a ratio between a dehumidifying ability and a heating ability can be finely adjusted. That is, the vehicle air-conditioning apparatus can perform the fine adjustment control as follows. With respect to a low thermal load time, during an extremely low thermal load time where an outside air temperature is further lowered, a heating ability is further enhanced by slightly closing the throttle of the variable expansion valve, while during the low thermal load time other than the extremely low thermal load time, a heating ability is set relatively low by relatively slightly opening the throttle of the variable expansion valve. Also with respect to an intermediate thermal load time, the throttle of the variable expansion valve is slightly closed during an intermediate low thermal load time where a thermal load is relatively low, and the throttle of the variable expansion valve is slightly opened during an intermediate high thermal load time where a thermal load is slightly high compared to the intermediate low thermal load time.

Figure 6:
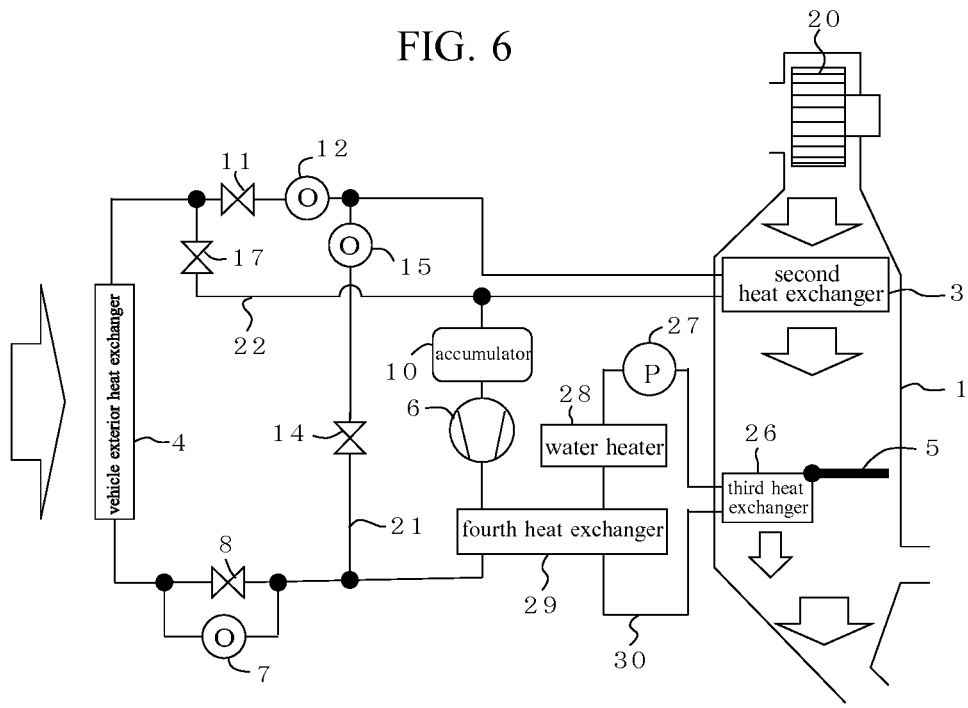
FIG. 6 is a view showing an example where a first heat exchanger of the vehicle air-conditioning apparatus shown in FIG. 1A is replaced with a warm water cycle which includes a third heat exchanger through which warm water is made to pass and a fourth heat exchanger which performs a heat exchange between warm water and a refrigerant.

In the above-mentioned constitution, the cycle configuration is adopted where a refrigerant discharged from the compressor 6 is supplied to the first heat exchanger 2 and hence, a warm-water-type heat exchanger which has been conventionally used cannot be directly used in the above-mentioned constitution. However, when an existing warm-water-type heat exchanger is used, the constitution shown in FIG. 6 may be adopted.

That is, the vehicle air-conditioning apparatus may be configured as follows. A well-known heat medium in a liquid form such as water or coolant is used as a working fluid. The vehicle air-conditioning apparatus includes a warm water cycle 30 which is constituted by sequentially connecting: a third heat exchanger 26 which performs a heat exchange between a heat medium in a liquid form and air; a pump 27 which feeds the heat medium in a liquid form under pressure; a water heater 28 which heats the heat medium in a liquid form; and a fourth heat exchanger 29 which performs a heat exchange between the heat medium in a liquid form and the refrigerant discharged from the compressor 6 by piping. The third heat exchanger 26 is arranged in the inside of the air conditioning unit 1 in place of the first heat exchanger 2, and an amount of air supplied to the third heat exchanger 26 is adjusted by the damper 5. The fourth heat exchanger 29 is interposed between the warm water cycle 30 and a portion of a path where a discharge side of the compressor 6 and the first bypass flow path 21 are connected to each other. The fourth heat exchanger 29 performs a heat exchange between a refrigerant discharged from the compressor 6 and the heat medium in a liquid form in the warm water cycle 30. The third heat exchanger 26 is provided for performing a heat exchange between the heat medium in a liquid form and air supplied from an upstream side of the air conditioning unit 1.

Due to such a constitution, it is possible to constitute the above-mentioned vehicle air-conditioning apparatus having the dehumidifying heating operation mode which can be changed over based on a thermal load using an existing warm-water-type heat exchanger.

Figure 7:
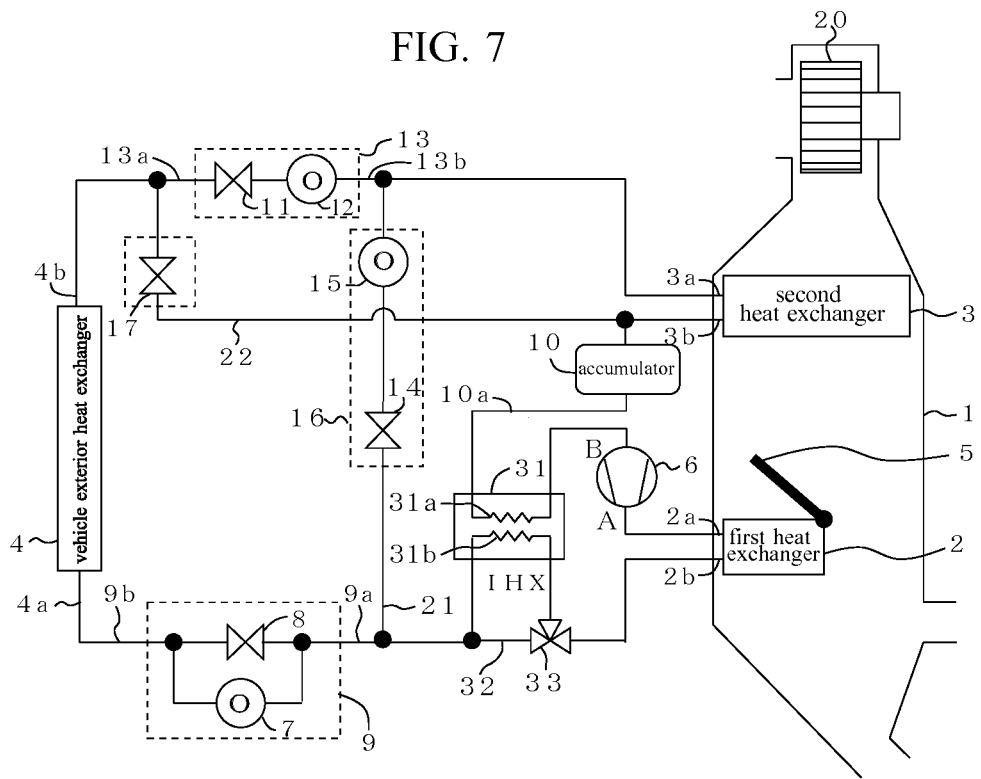
FIG. 7 is a view showing a constitutional example provided with an internal heat exchanger which performs a heat exchange between a refrigerant on an inlet side of a compressor of the vehicle air-conditioning apparatus shown in FIG. 1A and a refrigerant on an outlet side of a first heat exchanger.
Figures 8A, 8B:
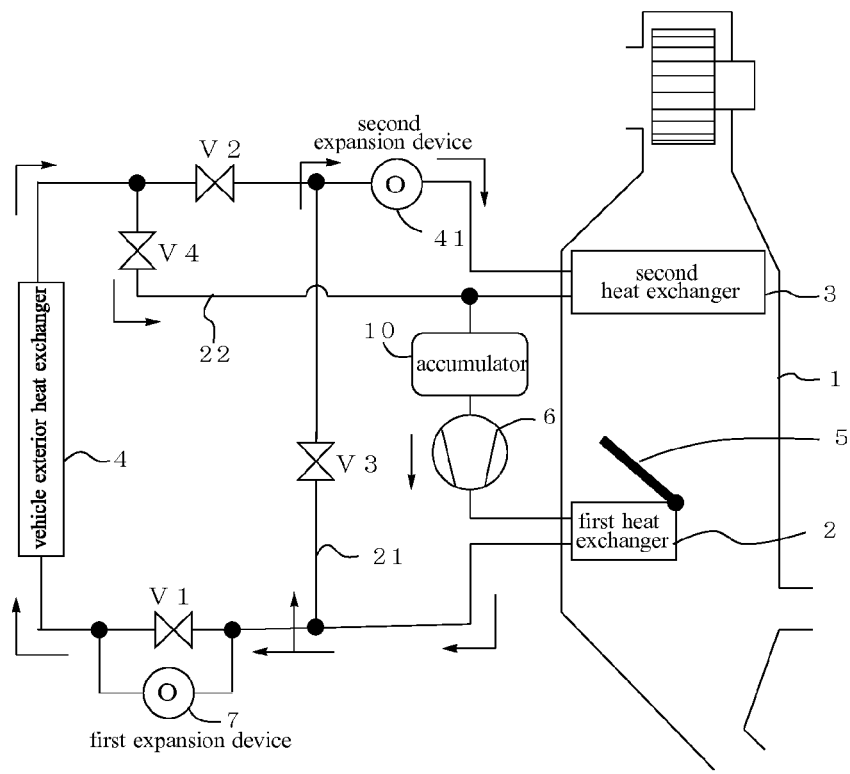
Figure 9:
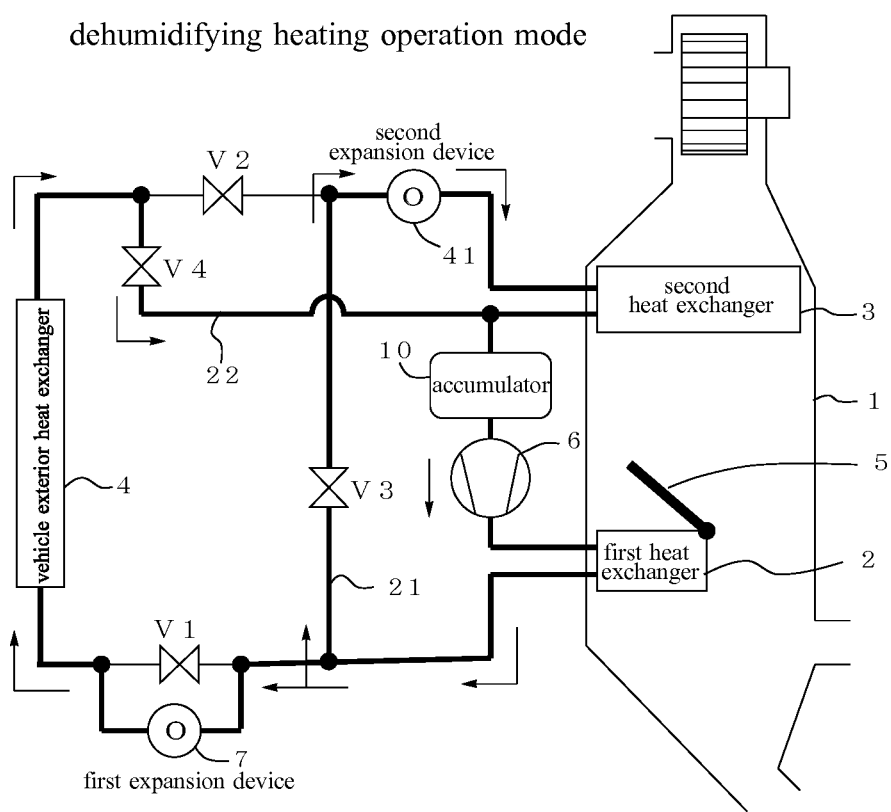
FIG. 9 is a view for explaining the flow of a refrigerant during a dehumidifying heating operation mode time in the conventional vehicle air-conditioning apparatus.

The vehicle air-conditioning apparatus having the above-mentioned constitution may further include, as shown in FIG. 7, an internal heat exchanger (IHX) 31 which performs a heat exchange between a refrigerant on a suction side of the compressor 6 (the outlet side 10a of the accumulator 10, for example) and a refrigerant on a discharge side of the first heat exchanger 2 so as to enhance a heat radiation ability of the first heat exchanger 2.

That is, a refrigerant which flows into the compressor 6 is made to pass through a low pressure side path 31a of the internal heat exchanger 31 (an inlet side of the low pressure side path 31a being connected to the outlet side 10a of the accumulator, and an outlet side of the low pressure side path 31a being connected to the suction side B of the compressor 6). A refrigerant which flows out from the first heat exchanger 2 is made to pass through a high pressure side path 31b of the internal heat exchanger 31 (the high pressure side path 31b being arranged on an outlet side of the first heat exchanger 2 and at a portion upstream of a portion of a path where the outlet side of the first heat exchanger 2 is connected to the first bypass flow path 21 in the direction along which a refrigerant flows).

Further, to enable the vehicle air-conditioning apparatus to select whether or not a heat exchange is performed by the internal heat exchanger 31, the vehicle air-conditioning apparatus may further include a third bypass flow path 32 which bypasses the high pressure side path 31b or the low pressure side path 31a (a path which bypasses the high pressure side path 31b in this embodiment), and the third bypass flow path 32 may be changed over to the high pressure side path 31b by a three-way valve 33.

Due to such a constitution, a heat radiation amount of the first heat exchanger 2 can be increased by the internal heat exchanger 31. Further, by performing a switching control of the three-way valve 33, the following advantages can be acquired. A heat radiation ability of the first heat exchanger 2 can be adjusted. It is possible to prevent a drive power of a compressor from becoming excessively large because of the excessive increase of pressure of a refrigerant which flows in the compressor 6. It is also possible to prevent a breakdown of the compressor 6 because of the excessive increases of a pressure of a refrigerant which is compressed by the compressor 6.

Although the mode for carrying out the invention has been explained heretofore, it is needless to say that the present invention can be suitably modified without departing from the gist of the present invention. For example, the explanation has been made with respect to the case where when a dehumidifying heating operation mode is set as the operation mode, whether a load state is during a low thermal load time or during an intermediate thermal load time is determined by using an outside air temperature as an index. However, the determination is made as follows instead of the above-mentioned manner of determination. That is, a cooling temperature detection means is directly mounted on the second heat exchanger or is arranged downstream of the second heat exchanger, a predetermined cooling temperature is set, and whether a load state is during a low thermal load time or during an intermediate thermal load time is determined based on whether or not a temperature detected by the cooling temperature detection means exceeds the predetermined cooling temperature. Alternatively, a heating temperature detection means is directly mounted on the first heat exchanger or is arranged downstream of the first heat exchanger, a predetermined heating temperature is set, and whether a load state is during a low thermal load time or during an intermediate thermal load time is determined based on whether or not a temperature detected by the heating temperature detection means exceeds the predetermined heating temperature. Further, whether the flow of a refrigerant is to be changed over is determined based on a cooling temperature detection means and a predetermined cooling temperature in a process where an outside air load is elevated from a low thermal load to an intermediate thermal load. On the other hand, whether the flow of a refrigerant is to be changed over is determined based on a heating temperature detection means and a predetermined heating temperature in a process where an outside air load is lowered to a low thermal load from an intermediate thermal load. Due to such determination, in whatever way an outside air load is changed in a dehumidifying heating operation mode, the shortage of a dehumidifying ability and the shortage of a heating ability can be surely prevented.

Further, although the first refrigerant control part, the second refrigerant control part, and the third refrigerant control part include the expansion device and the open/close valves respectively, any one of or all refrigerant control parts may be integrated into a variable expansion valve. Even when the refrigerant control part is formed of a variable expansion valve, it is possible to perform the selection whether or not a refrigerant is to be subjected to the adiabatic expansion in the first refrigerant control part, and the selection whether a refrigerant is to be subjected to the adiabatic expansion or the flow of the refrigerant is to be stopped in the second and third refrigerant control parts. Further, the number of parts can be reduced and hence, the productivity of the vehicle air-conditioning apparatuses and the degree of freedom in arranging the air-conditioning apparatus in a vehicle can be enhanced. Further, by forming the refrigerant control parts using a variable expansion valve, an air conditioning control can be performed more finely.

For example, in a cooling operation mode, by controlling the degree of throttling in the second refrigerant control part, a flow rate of a refrigerant is adjusted such that the refrigerant on the outlet side 3b of the second heat exchanger 3 has a fixed degree of superheat and hence, a temperature of the second heat exchanger 3 is made constant whereby a temperature of cold air can be made stable. In a heating operation mode, by controlling the degree of throttling by the first refrigerant control part, a temperature of warm air is suitably changed through the adjustment of a pressure of a refrigerant in the first heat exchanger whereby the controllability of a heating amount can be enhanced by adding a change in temperature of warm air to the adjustment of a ratio between air which passes through the first heat exchanger 2 and air which bypasses the first heat exchanger 2 by the damper 5.

REFERENCE SIGNS LIST

1: air conditioning unit
2: first heat exchanger

3: second heat exchanger
4: vehicle exterior heat exchanger
5: damper
6: compressor
7: first expansion device
8: first open/close valve
9: first refrigerant control part
10: accumulator
11: second open/close valve
12: second expansion device
13: second refrigerant control part
14: third open/close valve
15: third expansion device
16: third refrigerant control part
17: fourth open/close valve (fourth refrigerant control part)
21: first bypass flow path
22: second bypass flow path
25: three-way valve
26: third heat exchanger
27: pump
29: fourth heat exchanger
30: warm water cycle
31: internal heat exchanger

The invention claimed is:

1. A vehicle air-conditioning apparatus comprising:
a compressor;
a first heat exchanger arranged in the inside of an air conditioning unit and where an amount of air supplied to the first heat exchanger is adjusted by a damper;
a second heat exchanger arranged in the inside of the air conditioning unit, the second heat exchanger arranged upstream of the first heat exchanger in the direction of air flow in the air conditioning unit;
a vehicle exterior heat exchanger capable of performing a heat exchange with outside air;
a first refrigerant control part capable of throttling a first refrigerant flow path;
a second refrigerant control part capable of throttling and closing a second refrigerant flow path;
a third refrigerant control part capable of throttling and closing a third refrigerant flow path; and
a fourth refrigerant control part capable of closing a fourth refrigerant flow path, wherein
at least the compressor, the first heat exchanger, the first refrigerant control part, the vehicle exterior heat exchanger, the second refrigerant control part and the second heat exchanger are connected in the preceding order in a loop,
the first refrigerant flow path between the first heat exchanger and the first refrigerant control part and the second refrigerant flow path between the second refrigerant control part and the second heat exchanger are connected with each other by a first bypass flow path provided with the third refrigerant control part, and
the third refrigerant flow path between the vehicle exterior heat exchanger and the second refrigerant control part and the fourth refrigerant flow path between the second heat exchanger and the compressor are connected with each other by a second bypass flow path provided with the fourth refrigerant control part,
wherein when it is determined by a controller that a thermal load does not exceed a predetermined value in a dehumidifying heating operation mode, the first refrigerant flow path is throttled by the first refrigerant control part, the second refrigerant flow path is closed by the second refrigerant control part, the third refrigerant flow path is throttled by the third refrigerant control part, and the fourth refrigerant flow path is not closed by the fourth refrigerant control part so that a refrigerant discharged from the compressor is circulated in order of the first heat exchanger, the first refrigerant control part, the vehicle exterior heat exchanger, the fourth refrigerant control part, and the compressor, and the refrigerant is circulated in order of the first heat exchanger, the third refrigerant control part, the second heat exchanger, and the compressor, and
when it is determined by the controller that the thermal load exceeds the predetermined value in the dehumidifying heating operation mode, the first refrigerant flow path is throttled by the first refrigerant control part, the second refrigerant flow path is throttled by the second refrigerant control part, the third refrigerant flow path is throttled by the third refrigerant control part, and the fourth refrigerant flow path is closed by the fourth refrigerant control part so that a refrigerant discharged from the compressor is circulated in order of the first heat exchanger, the first refrigerant control part, the vehicle exterior heat exchanger, the second refrigerant control part, the second heat exchanger, and the compressor, and the refrigerant is circulated in order of the first heat exchanger, the third refrigerant control part, the second heat exchanger, and the compressor.

2. The vehicle air-conditioning apparatus according to claim 1, wherein
a cross-sectional area of a throttle portion of the first refrigerant control part is A, a cross-sectional area of a throttle portion of the second refrigerant control part is B, and a cross-sectional area of a throttle portion of the third refrigerant control part is C, and
the respective cross-sectional areas are controlled such that a relationship of $A \leq C$ is established when it is determined by the controller that the thermal load does not exceed the predetermined value in a dehumidifying heating operation mode, and the respective cross-sectional areas are controlled such that a relationship of $A \leq C < B$ is established when it is determined by the controller that the thermal load exceeds the predetermined value in the dehumidifying heating operation mode.

3. The vehicle air-conditioning apparatus according to claim 1, wherein
the first refrigerant control part is formed by connecting a first expansion device and a first open/close valve parallel to each other, the second refrigerant control part is formed by connecting a second expansion device and a second open/close valve in series, the third refrigerant control part is formed by connecting a third expansion device and a third open/close valve in series, and the fourth refrigerant control part is formed of a fourth open/close valve.

4. The vehicle air-conditioning apparatus according to claim 3, wherein the third expansion device is formed of a variable expansion valve.

5. The vehicle air-conditioning apparatus according to claim 1, wherein the damper is arranged upstream of the first heat exchanger in the direction of air flow.

6. The vehicle air-conditioning apparatus according to claim 1, wherein the controller includes at least one of an input circuit, a multiplexor, an arithmetic processing circuit, and an output circuit.

* * * * *